Figure 1:
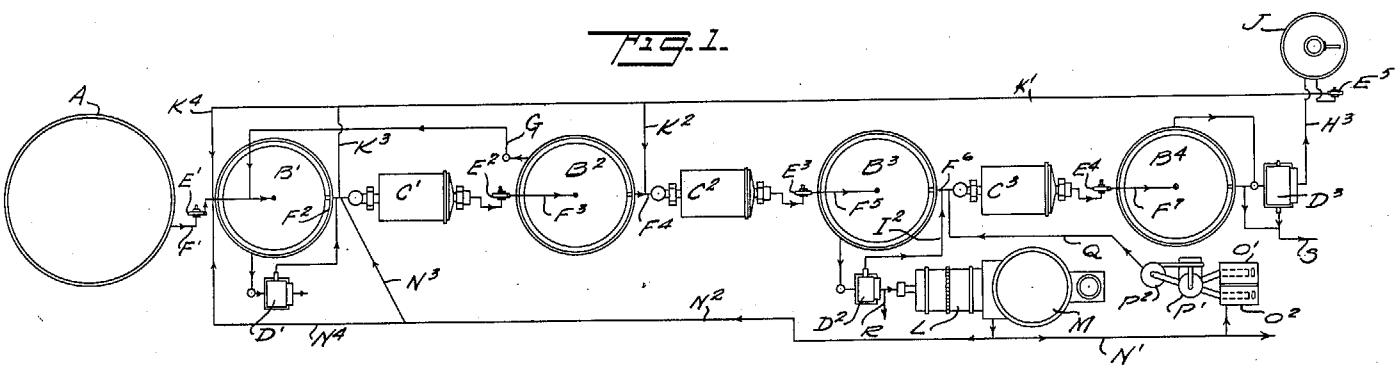

Dec. 1, 1931. G. C. HOWARD Re. 18,268

PROCESS OF TREATING WASTE SULPHITE LIQUOR

Original Filed Nov. 22, 1926

INVENTOR
Guy C. Howard
BY
Dyke, Holden & Schaines
ATTORNEYS

Reissued Dec. 1, 1931

Re. 18,268

UNITED STATES PATENT OFFICE

GUY C. HOWARD, OF WAUSAU, WISCONSIN, ASSIGNOR TO GUY C. HOWARD COMPANY, OF SEATTLE, WASHINGTON, A CORPORATION OF WASHINGTON

PROCESS OF TREATING WASTE SULPHITE LIQUOR

Original No. 1,699,845, dated January 22, 1929, Serial No. 149,976, filed November 22, 1926. Application for reissue filed March 11, 1930. Serial No. 435,009.

My invention relates to an improved process of treating waste sulphite liquor resulting from the manufacture of paper pulp by the sulphite process, whereby economic values are realized therefrom. It consists essentially in progressively precipitating certain constituents from the waste liquor and in recovering such precipitated matter from the residual liquor. The improvement over existing processes lies in the novel procedure whereby the precipitation is effected and in the novel manner by which the resulting precipitate is segregated into component parts. Its advantages lie in simplicity of operation and in economies due to increased yield and better segregation of products.

Waste sulphite liquor is an aqueous solution of non-cellulose substances which have been dissolved from the wood by the process of digestion. The major portion of the material in solution is regarded as a calcium salt of lignin sulphonic acid. Various carbohydrates are also present in considerable amounts and, as minor constituents, there are some resins, oils, proteins and, usually, free sulphur dioxide.

In the sulphite process of digestion the complex carbohydrates of the wood evidently hydrolize to simpler forms of carbohydrates which are soluble, and there is no apparent tendency for the complex types to re-form and precipitate in the waste sulphite liquor through reversal reactions. On the other hand, the lignin complex of the wood appears to go into solution through reaction with the calcium acid sulphite of the cooking liquor whereby a calcium salt of lignin sulphonic acid is formed. This reacton is reversible and tends to precipitate dissolved matter in the waste liquor except as equilibrium is established by the products of such reversal reactions.

The addition of suitable reagents, whereby the waste liquor is made alkaline and the concentration of sulphite ions ($SO_3$) and sulphate ions ($SO_4$) are kept as low as possible, favors the reversal reactions. These may be carried practically to completion under the procedures embodied in this invention, with the result that calcium sulphite and an amount of organic matter equivalent to substantially all the lignin constituent in the waste liquor can be precipitated and recovered as separate products, and the carbohydrate content retained in the residual liquor. Calcium oxide, or hydroxide (caustic lime), is a commercial reagent that meets the requirements for precipitation, and from an economic standpoint is preferred, although I do not wish to confine myself to this reagent alone.

According to one form of my invention calcium oxide, or hydroxide, is added gradually, with stirring, to waste sulphite liquor. A white crystalline precipitate begins to form at once and the liquor darkens in color. This continues as more lime is added until the liquor becomes a distinct purplish color and a heavy crystalline precipitate readily settles out and the liquor tests alkaline. Analysis shows this precipitate to be calcium sulphite together with a minor amount of calcium sulphate, but practically free from organic matter.

On filtering out this crystalline precipitate and slowly adding more lime to the clear filtrate, a further precipitation takes place which is a mixture of fine crystals and organic matter. At first this organic precipitate is highly dispersed and difficult to filter out, but with more lime it increases in amount and finally flocculates to a voluminous yellow precipitate intimately mixed with fine crystals, which settle gradually and filters readily. The amount of organic matter thus precipitated up to this distinct flocculation point is not sufficient to account for all the lignin constituent of the sulphite liquor. The addition of more lime causes a further precipitation of organic matter, but I have found it impossible to effect complete precipitation of the lignin content by thus adding lime in the presence of all this flocculated organic precipitate, at least without the use of such a large excess as to be prohibitive from an economic standpoint, and it is doubtful whether it can be completely accomplished without first removing the initial flocculated precipitates. If, however, the flocculated precipitate is removed and an excess of fresh lime reagent added, a substantially complete precipitation of the remaining lignin content can be accomplished.

Various significant facts may be observed when calcium oxide or hydroxide is added to waste sulphite liquor. The solid phase lime particles are immediately coated over with a mixture of organic matter and small crystals similar to the yellow precipitate mentioned above. The coating evidently does not materially mask the reaction surface of the lime particles until the system reaches the condition at which the yellow precipitate flocculates. After this flocculation point is reached the reaction begins to lag even though lime reagent is still present.

These observations indicate that the reaction by which the yellow organic matter is precipitated by the lime reagent is one that takes place most readily, if not entirely, at the surface of solid phase lime particles and that the flocculated precipitate of organic matter tends to mask the lime surfaces. It cannot be said with certainty that the precipitation takes place only at such surfaces but there is evidence indicating that the presence of fresh solid phase lime facilities precipitation. It is an accepted principle that an excess of reagent must be used to assure complete precipitation and, apparently, the heretofore unsolved problem in precipitating such organic matter from sulphite liquor to practical completeness, with lime, is to effectively establish this excess in the presence of a flocculated organic precipitate which tends to mask the reagent surfaces.

In order to precipitate the maximum amount of organic matter from sulphite liquor with the use of a minimum quantity of lime reagent, I have found the best results are obtained in accordance with a second form of my invention, which comprises adding lime reagent in excess to the residual liquor, from which the major portion of the lignin constituent has been previously removed, whereby a practically complete precipitation of the lignin remaining in this residual liquor is effected, and then separating out the mixture of unconsumed lime and lignin precipitate and using it as the reagent to treat a fresh quantity of sulphite liquor. This procedure assures an excess of reagent at the proper stage and a large free surface of solid phase lime to facilitate complete precipitation of the lignin in the residual liquor, and it best conserves the lime reagent in that the excess is returned to the system for treatment of fresh liquor. This manner of practicing the invention causes an enrichment of the waste sulphite liquor which is being treated, as regards its dissolved lignin content, by reason of the fact that some of the above mentioned lignin precipitate is, through a reversal of the reaction by which it was formed, decomposed and dissolved by the waste sulphite liquor to which it is added as reagent. This procedure also aids the segregation and removal of both the inorganic and organic products derived from the original liquor.

In principle and in effect this procedure is quite different from simply adding an excess of reagent to the original liquor in the effort to get complete precipitation, especially when dealing with a reaction of this character wherein the flocculated precipitate of organic matter tends to mask the lime surfaces.

In the accompanying drawings,—

Figure 2:
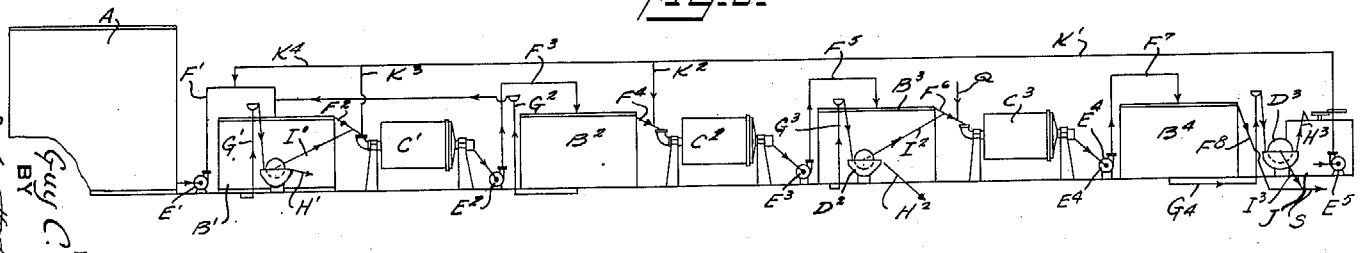

Figure 1 is a plan view and Fig. 2 a side elevation with parts omitted of apparatus, which illustrates diagrammatically a process in accordance with my invention.

In said drawing A represents a storage tank in which waste sulphite liquor is collected, $B^1$, $B^2$, $B^3$ and $B^4$ are sedimentation tanks of the Dorr type or equivalent. $C^1$, $C^2$ and $C^3$ are reaction cells disposed intermediate the successive sedimentation tanks which provide suitable time and mechanical mixing to accomplish the desired reaction, and in which the temperature of the liquor in process can be elevated or sustained by means of steam supplied through pipes, not shown. $D^1$, $D^2$ and $D^3$, are filters of the continuous drum type. $E^1$, $E^2$, $E^3$, $E^4$ and $E^5$, are pumps. $F^1$, $F^2$, $F^3$, $F^4$, $F^5$, $F^6$, $F^7$ and $F^8$, are overflow and other liquor pipe lines. $G^1$, $G^2$, $G^3$, and $G^4$, are underflow liquor pipe lines; and $H^1$, $H^2$, and $H^3$ are filter cake lines. J is a storage tank with agitator for the intermediate or secondary reagent. $K^1$, $K^2$, $K^3$, and $K^4$ are secondary reagent lines, and Q is a primary reagent supply line. L is a rotary combustion furnace in connection with a steam boiler M; and $N^1$, $N^2$, $N^3$ and $N^4$ are pipe lines for conveying the ash reject from the furnace L. $O^1$, $O^2$, and $P^1$, $P^2$ are dry reagent storage bins and pulverizing equipment.

With reference to the drawings, the process may be described as follows: The overflow liquor from $B^3$, together with the filtrate from filter $D^2$ through $I^2$, constitutes sulphite liquor from which the major portion of the lignin content has been removed, as will be explained later. Such sulphite liquor enters reaction cell $C^3$ through pipe $F^6$ and into which is added through pipe Q all the primary lime reagent used by the process. This reagent may consist entirely of fresh calcium oxide or hydroxide, or this caustic lime may be mixed with part, or all, of the pulverized ash derived from rotary furnace L, the function of which will be explained later.

In cell $C^3$ the reaction is completed whereby substantially all of the remaining lignin content of the liquor is precipitated by reason of the relative excess of reagent and the free solid phase lime surface available.

The precipitated liquor then passes through pump $E^4$ to sedimentation tank $B^4$, in which the precipitated matter together with its associated unconsumed reagent settles out, and is withdrawn through underflow pipe $G^4$ into filter $D^3$. The filter cake $D^3$ is conveyed through $H^3$ to tank J, wherein it is maintained as a fluid sludge for further use as a secondary reagent. The clear overflow from $B^4$ passes through pipe $F^8$ to join the filtrate in line $I^3$ from $D^3$, and thence is withdrawn from the process through pipe S for discharge to sewer or for treatment to utilize its carbohydrate content. The fluid sludge in J is delivered by pump $E^5$ to main pipe $K^1$, from which it is withdrawn in controlled amounts through branch pipes $K^2$, $K^3$, and $K^4$ to serve as a precipitating reagent for the incoming liquor, as will now be explained. This sludge reagent has a higher alkalinity than any of the liquors to which it is to be added as hereinafter described, and consequently, when so added, it decreases the acidity or increases the alkalinity of the system at the point where it is added. In the claims, the terms "low alkalinity" and "lower alkalinity" are intended to include alkalinity of negative value, i. e., acidity, and the term "increasing the alkalinity" includes the decreasing of acidity.

The hot waste sulphite liquor as it comes from the digester blow pits is accumulated in storage tank A, from which pump $E^1$ delivers it at a controlled rate of flow to $B^1$, together with the underflow from $B^2$, through $G^2$ and a controlled amount of reagent which enters through pipe $K^4$. The quantity of reagent thus added to $B^1$ is so regulated that the sulphite liquor is not carried beyond the purple stage, and hence the sludge settling out in $B^1$ is inorganic salts largely free from organic matter, the precipitated organic matter in the reagent from pipe $K^4$ and in the underflow from $B^2$ being largely or entirely dissolved by the waste sulphite liquor in $B^1$.

This sludge from $B^1$ is withdrawn as underflow $G^1$ and is delivered to filter $D^1$, which yields a filtrate, that returns to the system through $I^1$, and also a filter cake composed largely of calcium sulphite, which is withdrawn at $H^1$ for use in making up fresh cooking acid.

The overflow from $B^1$ passes through $F^2$ into reaction cell $C^1$, together with the secondary lime reagent which is admitted through pipe $K^3$. The amount of reagent added at this point is gauged by the character of overflow from the subsequent tank $B^2$, and is so regulated that this overflow liquor is somewhat beyond the purple stage, but not so far beyond that the underflow from $B^2$ would carry an excessive amount of precipitated organic matter which would result in causing undue organic matter to exit as underflow from $B^1$. The reaction cell $C^1$ is a revolving drum or equivalent which serves to properly mix the liquor with the reagent and give time for completion of the reaction. This cell $C^1$ is similar to the other reaction cells, and each may be connected with a steam supply pipe (not shown) for the purpose of raising or sustaining the temperature of the liquor during treatment.

The precipitate that settles out in $B^2$ is largely the inorganic calcium sulphite together with some organic matter, depending on how far the reaction has been carried in $C^1$. This sludge is returned through $G^2$ to $B^1$ wherein its organic matter is redissolved and the calcium sulphite exists to filter $D^1$.

The return of this sludge to the waste liquor in the tank $B^1$ is a step in a cyclic process (or sub process) which is carried on in the tank $B^1$, reaction cell $C^1$ and tank $B^2$ in the manner described.

Up to the point of overflow from $B^2$, the process has accomplished the maximum precipitation possible of calcium sulphite without an admixture with organic matter in excessive amounts, and has allowed the removal of this calcium sulphite as a clean product on filter $D^1$.

The liquor overflow from $B^2$ passes to cell $C^2$ through pipe $F^4$, together with the secondary reagent admitted through pipe $K^2$. The amount of reagent added at this point through pipe $K^2$ will be all of the filter cake currently produced at filter $D^3$, less that which has been currently used through pipes $K^3$ and $K^4$. Under normal operation such reagent will suffice to throw down the major portion of the lignin content of the sulphite liquor as a yellow flocculated precipitate, and this can be assured by regulating the amount of primary lime reagent which is added through pipe Q into reaction cell $C^3$.

On completion of the reaction in cell $C^2$, the charge is delivered by the pump $E^3$ to tank $B^3$, in which the yellow precipitate settles out and is withdrawn as underflow through $G^3$ to filter $D^2$. The filtrate from $D^3$, together with the overflow from $B^3$, passes on to the cell $C^3$ for the further treatment already described.

The filter cake from $D^2$ is composed of organic matter together with some fine inorganic crystals. It is either burned in the rotary furnace L to generate steam and to recover the ash for re-use as precipitating reagent in the process, or it may be withdrawn through R for further treatment in apparatus (not shown), whereby the organic and inorganic components of this material are segregated.

The inorganic crystals which are mixed with the yellow organic precipitate are apparently calcium sulphite alone or the same mixed with calcium sulphate, and the yellow organic matter is believed to be either the original lignin constituent of the sulphite liquor thrown down by decomposition of the lignin sulphonic acid combination or perhaps this original lignin component which has subsequently combined through its hydroxyl radical with the excess lime to form a compound analogous to a calcium phenolate or basic calcium phenolate.

The amount of lime in this yellow precipitate removed at $D^2$ normally exceeds that required to form sulphite or sulphate with the sulphur content of this material, but whether this excess represents particles of unconsumed lime reagent, or lime in some definite combination with the organic matter, is not known with certainty at this time. I have found, however, that the ash resulting from the burning of this yellow precipitate removed at $D^2$ has some reagent value in precipitating fresh sulphite liquor; hence provision is made to return this ash from the furnace L to the system either through $N^1$ and Q to cell $C^3$ or through $N^2$ or $N^4$ to the system ahead of $B^2$.

The process as above described has accomplished the practically complete segregation of the waste sulphite liquor into three primary products: first, an inorganic product consisting largely of calcium sulphite, which can be used in making fresh cooking acid; second, an organic precipitate which constitutes the entire lignin content of the liquor associated with a minor amount of inorganic crystals, and which can be utilized for fuel or other purposes; and, third, a residual liquid product that contains the carbohydrate content of the original liquor. It will be seen that my invention enables the effecting of substantially complete precipitation of the lignin constituent with a minimum consumption of reagent, whereby the segregation of the liquor into these three distinct products is made profitable.

What I claim is—

1. The process of treating waste sulphite liquor which consists in adding a suitable reagent in solid phase form and in relative excess amount to an alkaline solution of the sulphite liquor from which the major portion of the calcium lignin sulphonic acid constituent has been previously decomposed and removed, whereby a substantially complete decomposition and precipitation of the remaining lignin sulphonic acid combination is accomplished, separating out the precipitate so formed together with its associated unconsumed reagent and using it to effect the decomposition and precipitation of the major amount of calcium lignin sulphonic acid constituent in a quantity of waste sulphite liquor.

2. The process of treating waste sulphite liquor as defined in claim 1 wherein the said suitable reagent is an alkaline earth reagent.

3. The process of treating waste sulphite liquor as defined in claim 1 wherein the said suitable reagent is a caustic lime reagent.

4. The process of treating waste sulphite liquor which consists in adding a caustic lime reagent in solid phase form and in relative excess amount to an alkaline solution of the sulphite liquor from which the major portion of the calcium lignin sulphonic acid constituent has been previously decomposed and removed, whereby a substantially complete decomposition and precipitation of the remaining lignin sulphonic acid combination is accomplished, separating out the precipitate so formed together with its associated unconsumed reagent and using it to effect the decomposition and precipitation of the major amount of calcium lignin sulphonic acid constituent in a quantity of waste sulphite liquor, and segregating and recovering decomposition products of the character and in the manner described.

5. The process of treating waste sulphite liquor which consists in adding a suitable alkaline reagent in solid phase form to the waste sulphite liquor until an inorganic and a flocculated organic precipitate is formed, separating out such precipitated matter and adding an excess of such alkaline reagent in solid phase form to the residue liquor whereby a further and practically complete precipitation of the lignin constituents of the liquor takes place, and finally separating such precipitate together with its associated unconsumed alkaline reagent from the residual liquor.

6. The process of treating waste sulphite liquor which consists in adding a suitable alkaline reagent in solid phase form to the waste sulphite liquor until an inorganic and a flocculated organic precipitate is formed, separating out such precipitated matter and adding an excess of such alkaline reagent in solid phase form to the residue liquor whereby a further precipitation of certain constituents of the liquor takes place separating such precipitate together with its associated unconsumed alkaline reagent from the residual liquor and finally adding the unconsumed reagent thus recovered to a quantity of waste sulphite liquor.

7. The process of treating waste sulphite liquor as defined in claim 1, wherein the ash remaining from the burning of the precipitated and removed organic matter resulting from the decomposition of said calcium lignin sulphonic acid constituent, is utilized as a reagent in said process to precipitate fresh sulphite liquor.

8. The process of treating waste sulphite liquor which consists in adding a suitable alkaline reagent in solid phase form and in relative excess amount to alkaline waste sulphite residual liquor from which the major portion of the calcium lignin sulphonic acid constituent has been previously decomposed and removed, whereby a further decomposition and precipitation of the calcium lignin sulphonic acid combination is accomplished, separating out the precipitate so formed together with its associated unconsumed reagent and using it in increasing the alkalinity of a quantity of waste sulphite liquor.

9. The process of treating waste sulphite liquor which consists in adding a caustic lime reagent in solid phase form and in relative excess amount to an alkaline waste sulphite residual liquor from which the major portion of the calcium lignin sulphonic acid constituent has been previously decomposed and removed, whereby a further decomposition and precipitation of the calcium lignin sulphonic acid combination is accomplished, separating out the precipitate so formed together with its associated unconsumed caustic lime and using it in increasing the alkalinity of a quantity of waste sulphite liquor, thereby aiding in segregating and recovering decomposition products of the character and in the manner described.

10. The process of treating waste sulphite liquor which consists in adding solid phase caustic lime thereto until an inorganic and a flocculated organic precipitate is formed sufficient in quantity to cause a material lag in the reaction, separating out such precipitated matter and adding an excess of solid phase caustic lime to the residue liquor whereby a further and practically complete precipitation of the lignin constituents of the liquor takes place, and finally separating such precipitate together with its associated unconsumed solid phase caustic lime from the residual liquor.

11. The process of treating waste sulphite liquor which consists in adding caustic lime in solid phase form to the waste sulphite liquor until a heavy precipitate of calcium sulphite practically free from organic matter is obtained, separating said precipitate and adding solid phase caustic lime to the residual liquor until an inorganic and a flocculated organic precipitate is formed sufficient in quantity to cause a material lag in the reaction, separating out such precipitated matter and adding to the residual liquor solid phase caustic lime in excess whereby a further and practically complete decomposition and precipitation of the calcium lignin sulphonic acid constituent takes place, and finally separating such precipitate together with its associated unconsumed solid phase caustic lime reagent from the residual liquor.

12. The process of treating waste sulphite liquor which comprises reacting with caustic lime reagent in solid phase form and in excess upon previously treated liquor, from which a large portion of the calcium lignin sulphonic acid constituent has been previously decomposed and removed, until a flocculated organic precipitate is formed mixed with unconsumed reagent, and in reacting upon waste sulphite liquor with such mixture.

13. The process of treating waste sulphite liquor which comprises adding thereto a mixture of caustic lime reagent in solid phase form and a flocculated organic precipitate, said precipitate having been obtained by reaction of caustic lime reagent in solid phase form upon waste sulphite liquor.

14. The process of treating waste sulphite liquor from wood digestion which comprises acting thereon with a sludge material which has been derived from the process and comprising solid phase lime reagent mixed with precipitated lignin material that is soluble in the waste sulphite liquor, whereby said soluble material is dissolved and said lime reagent reacts on the liquor to precipitate insoluble inorganic material, and separating and withdrawing same.

15. The process of treating waste sulphite liquor which comprises acting thereon with caustic lime in solid phase form to obtain a precipitate of mixed inorganic and organic solid material, separating said precipitate from said liquor and adding it to waste sulphite liquor of lower alkalinity than that from which it was separated.

16. A process of treating waste sulphite liquor which comprises the steps of reacting thereon with a mixture of caustic lime in solid phase form and solid lignin-containing material, thereby largely dissolving said lignin-containing material and precepitating lime reaction products, and separating such precipitate from residual liquid.

17. A process of treating waste sulphite liquor which comprises the steps of reacting thereon with a mixture of caustic lime in solid phase form and solid lignin-containing material, thereby largely dissolving said lignin-containing material and precipitating lime reaction products, separating such precipitate from residual liquid, and reacting on the residual liquid with fresh caustic lime in solid phase form.

18. The process of treating waste sulphite liquor which comprises reacting thereon with a mixture of caustic line reagent in solid phase form and a flocculated organic precipitate, said precipitate having been obtained by reaction of caustic lime reagent in solid phase form upon waste sulphite liquor, the quantity of mixture added being so regulated as to effect substantial solution of said flocculated organic precipitate and production of a precipitate composed largely of calcium sulphite, and in separating and recovering said precipitate.

19. A process of treating waste sulphite liquor which comprises reacting thereon with caustic lime in solid phase form until sufficiently alkaline that a mixture of calcium sulphite precipitate and flocculated organic precipitate is formed, adding such mixture to waste sulphite liquor and thereby dissolving some of said organic precipitate, and separating from the liquid the undissolved precipitate consisting largely of inorganic material.

20. The process of treating waste sulphite liquor which comprises reacting thereon with a caustic lime reagent in solid phase form until an inorganic precipitate and a flocculated lignin-containing precipitate have been formed, the latter being in quantity sufficient to cause a masking of the reaction surface of the reagent particles resulting in a material lag in the reaction, separating out such precipitated matter, and reacting with caustic lime reagent in solid phase form on the residual liquor whereby a further and practically complete precipitation of the lignin constituent of the liquor takes place, and finally separating out such precipitate.

21. The process of treating waste sulphite liquor which comprises reacting thereon with a caustic lime reagent in solid phase form until an inorganic precipitate and a flocculated lignin-containing precipitate have been formed, the latter being in quantity the major portion of the lignin content of the sulphite liquor, separating out such precipitated matter, and adding caustic line reagent in solid phase form to the residual liquor whereby a further and practically complete precipitation of the lignin constituent of the liquor takes place, and finally separating such precipitate.

22. The process of treating waste sulphite liquor which comprises reacting thereon with a caustic lime reagent in solid phase form until a heavy crystalline precipitate is formed and the liquor tests alkaline, separating out said precipitate, and reacting on the residual liquor with caustic lime reagent in solid phase form until a flocculated lignin containing precipitate has been formed, the latter being in quantity sufficient to cause a masking of the reaction surface of the reagent particles resulting in a material lag in the reaction, separating out such precipitated matter, and adding caustic line in solid phase form to the residual liquor whereby a further and practically complete precipitation of the lignin constituent of the liquor takes place, and finally separating out such precipitate.

23. The cyclic process of treating waste sulphite liquor which comprises reacting on partially processed liquor with a mixture of caustic lime and lignin-containing material both in solid form to produce a precipitate of inorganic calcium salts, separating from the partially processed liquor the precipitate mixed with solid lignin-containing material, reacting on such mixture with waste sulphite liquor to substantially decompose and dissolve the lignin-containing material, separating the precipitate from the resulting liquor and treating the latter as partially processed liquor in the manner aforesaid.

24. In a process of treating waste sulphite liquor, enriching the lignin content thereof by reacting thereon with a mixture of caustic lime in solid phase form and a lignin containing material precipitated from waste sulphite liquor by caustic lime in solid phase form, and then reacting upon the enriched liquid with caustic lime in solid phase form to precipitate lignin containing material.

25. In a process of treating waste sulphite liquor with caustic lime, the steps of establishing an effective excess of lime reagent relative to the waste sulphite liquor which comprise transferring solid phase caustic lime reagent masked with flocculated precipitate into liquor of sufficiently low alkalinity to cause a dissolving of such precipitate with a resultant unmasking of reactive lime.

26. A process of treating waste sulphite liquor, which comprises adding thereto a flocculated precipitate of lignin containing material obtained by treatment of waste sulphite liquor with solid phase caustic lime, and decomposing and dissolving such precipitate by a reversal of the reaction by which it was formed, whereby the lignin content of the waste sulphite liquor to which it is added is increased.

27. A process of treating waste sulphite liquor which comprises reacting thereon with caustic lime in excess to produce a mixture of unconsumed solid phase lime and a flocculated precipitate of lignin containing material, and reversing such reaction and utilizing such excess lime by separating out said mixture and adding it to other waste sulphite liquor.

28. The process of treating waste sulphite liquor which comprises reacting on partially processed liquor with caustic lime in solid phase form and in excess to obtain a mixture of precipitated inorganic and organic solid material and unconsumed solid phase lime, separating said mixture from said liquor, and adding said mixture to original waste sulphite liquor to cause a lowering of the degree of acidity of said liquor and a substantial dissolving of said organic material, removing undissolved and precipitated solids, adding to the resulting liquor more of such a mixture of inorganic and organic material and solid phase caustic lime sufficient to decompose and precipitate the major portion of its calcium lignin sulphonic acid constituent, and separating said precipitate from said last named liquor.

In testimony whereof, I have signed my name hereto.

GUY C. HOWARD.